March 14, 1950     N. M. NESSET     2,500,199
DISPENSING OF LIQUIDS
Filed April 3, 1946
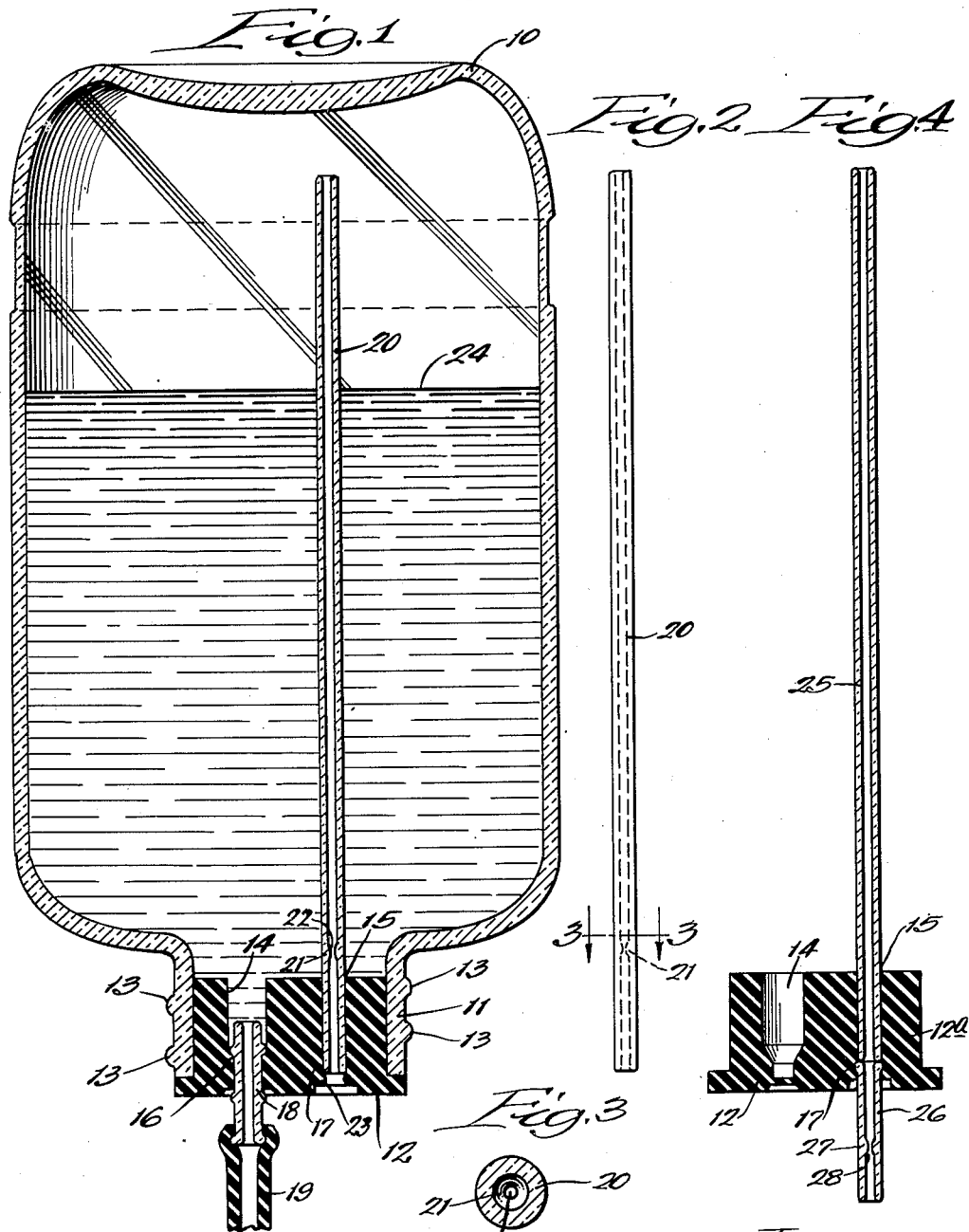

Patented Mar. 14, 1950

2,500,199

UNITED STATES PATENT OFFICE 2,500,199

DISPENSING OF LIQUIDS

Naurice M. Nesset, Glenview, Ill., assignor to Baxter Laboratories, Inc., Glenview, Ill., a corporation of Delaware Application April 3, 1946, Serial No. 659,384

4 Claims. (Cl. 128—272)

This invention relates to the dispensing of liquids, and more particularly to a device for dispensing liquids, such as parenteral solutions, and for providing a flow indicator in the dispensing device.

An object of the invention is to provide in a device for dispensing liquids, such as intravenous solutions and blood plasma, a simple and effective device for indicating the flow of liquid from the dispensing container. Another object is to provide a device in which the surface tension of the liquid is utilized in providing a flow indicator. Still another object is to provide a device in which the air tube, which is used in introducing air to a container from which solutions are being dispensed, is arranged to provide an indicator for the flow of liquid from the container.

Another object of the invention is to provide a flow indicator for containers for dispensing liquids which is automatically operated when the container is used. A further object is to provide an air tube for a container for dispensing liquids which is equipped with one or more constrictions therein so as to form from liquid within the tube a liquid seal across the tube at the point of constriction. A further object is to provide a container with an air tube extending into the air passage of the closure and having a constriction near the closure which provides with the film of water-salt solution or other liquid therein a small liquid seal across the constriction, such liquid seal forming periodic explosive strokes toward the free end of the tube when the container is inverted and liquid is being drained therefrom, the strokes of the liquid providing an indicator of the amount of liquid being withdrawn. Yet another object is to provide an attachable tube which may be inserted from the outside into the air passage of the closure to provide an external visual indicator of flow of liquid.

Other features and advantages will appear from the following specification and drawing, in which—

Figure 1 is a vertical sectional view of the dispensing container in a position for the dispensing of liquid, the container being equipped with a drain tube and connector fitting therefor; Fig. 2, a plan view of the flow indicator air tube; Fig. 3, a transverse sectional view, the section being taken as indicated at line 3 of Fig. 2; and Fig. 4, a vertical sectional view of a modified structure in which an external indicator tube is employed.

The invention contemplates providing the air passage of the closure with a tube which has a constriction preferably near the closure. A film of liquid is maintained within the tube, and when the container is in inverted position for drainage, as illustrated in Fig. 1, the film of liquid within the air tube flows downwardly and forms a seal about the constriction, bridging the capillary passage therethrough and forming a liquid seal. The surface tension of the liquid about the constriction is so tenacious that a stretching of the seal occurs, and when the air bursts through, it does so with an explosive force, carrying the liquid as a body upwardly into the top portion of the tube. Sometimes a second seal is formed near the top of the tube which remains as a visual bridge across the tube until the next stroke of the liquid about the constriction. The periodic stroke of the liquid indicates the amount of liquid that is being withdrawn to a person skilled in this field and who will take into account, in computing the rate of withdrawal, the quantity of liquid within the container.

In the embodiment of the invention shown in Figs. 1 to 3 inclusive, a container 10 is provided with an open neck 11 and a closure 12 sealing the open neck. The container may be of any suitable type. In the drawing shown, a container suitable for dispensing water-salt solutions, such as are used intravenously, or any other solutions or blood or blood plasma, etc., is shown. The neck of the container may be provided with ribs 13 on the outer surface thereof, to which a closure cap (not shown) may be secured when the container is completely sealed. The ribs 13 may, as shown, be in the form of threads and a bead.

The closure 12 in the open neck 11 of the container may be a resilient plug of the type normally used in such containers. If desired, the plug, as shown, may be equipped with a pair of passages 14 and 15 extending therethrough. These passages, when the container is completely sealed, may be sealed by a resilient diaphragm extending across the same or by any other suitable means.

A fitting 18 is shown inserted through the constricted portion 16 of the passage 14 and is equipped at its outer end with a resilient tube 19 for the withdrawal of liquid from the container.

An air tube 20 is provided internally at 21 with a constriction which provides a capillary passage 22 in the tube. The constriction may be essentially Venturi-shaped, having tapered or flared portions on either side of the point of greatest constriction. The external diameter of the tube 20 remains unchanged so that there is no weakening of the tube as a result of the constriction therein. The tube 20 is received within the passage 15 in the closure 12 and supported thereby.

When the container is to be used, the closure cap (not shown) is removed from the neck of the container, and the container with its open neck in upper position is prepared for use. The connector fitting 18 is inserted in the passage 16. The passage 15 is opened. If an integral diaphragm extends across this passage to close the same, this diaphragm is punctured. The container is then inverted and placed in the position shown in Fig. 1 in which the liquid is dispensed from the container.

As shown more clearly in Figs. 1 and 2, the glass air tube 20 is equipped with a constriction 21, which is preferably disposed adjacent the end of the tube which is received within the closure 12. Since the stroke of the liquid is quite long, exceeding two inches, and often reaching the free end of the tube, it is highly desirable to have the constriction close to the closure 12. This leaves a greater part of the tube, and particularly that portion of the tube which is visible, available for the upward movement of the liquid piston or exploded liquid. The constriction may be formed in the glass tube by heating the glass to soften it, thereby permitting the inward flow of the walls of the tube, but it is important that the tube be slightly shortened to compensate for the inflow of material while preserving the outer diameter the same as before. Since considerable stress is placed upon the tube in shaping and handling, it is extremely important that there be no weakness at any point in its length, and particularly near the closure where the stress will be greatest. While two or more constrictions in the tube may be employed, I prefer the single constriction as illustrated.

The capillary passage or constricted passage 22 of air tube 20 should be of a width or diameter sufficiently small to permit the forming of a liquid seal across the constricted portion of the tube when a film of liquid is maintained in the tube. I prefer to fill the tube 20 with liquid at the time when the container is filled. I prefer to induce a vacuum at the time that the closure is sealed, and under the influence of vacuum, liquid normally fills the tube 20. When the air passage is unsealed at the time of use and the container inverted, the inrush of air through the tube clears the tube of the main body of the liquid but leaves on the surface a sufficient amount of water or solution to form the liquid seal required. The surface tension of the water-salt solution or other liquid causes a self-sustaining film of liquid seal across the constricted portion of the tube. The constriction should be of a width such as will permit the forming of such a liquid seal of water or a water solution. For example, in an air tube in a container for intravenous solutions, the tube may be of an internal diameter of approximately ⅛ inch, while the constriction may be of an internal diameter of approximately 3/64 inch. Such a constriction will support a water or water-salt solution film across the constriction.

In the operation of the device, the container is placed in the inverted position seen in Fig. 1, with the outlet fitting 18 communicating with the passage 14 in the closure 12 and the air tube 20 in the passage 15, the passage 15 being open to permit free communication of the air tube with the atmosphere outside the container. The air tube extends into the container to a point above the level 24 of the liquid therein. As the liquid flows from the container through the outlet fitting 18, the air pressure within the container is reduced. When the differential between the internal and external pressures exceeds the strength of the seal, the seal is broken and air passes into the container through the air tube 20. When the air passing into the air tube 20 breaks the liquid seal at 22, the liquid is exploded upwardly into the channel of the tube 20. The liquid is thrown against the walls of the tube and flows back to form another film or seal across the constriction at 22. When sufficient liquid has been withdrawn from the container to create again a pressure differential between the interior of the container and the atmospheric pressure greater than the strength of the liquid film or seal across the constriction in the air tube, the seal will again be broken by the passage of air therethrough. This happens repeatedly as the liquid flows from the container. Since the container and air tube are made of transparent materials, the breaking of the liquid film or seal is visible and indicates the rate of flow of the liquid from the container. Thus, even though the liquid flows from the container very slowly, the periodic breaking of the liquid film across the constriction indicates the flow of liquid from the container.

If desired, the device may be used as a meter or measuring device or the air tube may be employed merely as an indicator of flow.

When the air tube, as shown, extends from the closure to a portion of the container adjacent the wall thereof opposite the closure, the air passing into the container through the air tube does not pass through the body of liquid within the container, at least when the level of the liquid as shown is below the open end of the air tube. In this manner, any tendency toward contamination of the liquid with any impurities which might be present in the air is minimized.

In the construction shown in Fig. 4, the tube 25 received within the passages 14 of the closure 12ᵃ is not provided with a constriction. However, a second piece of tubing 26 may be inserted through the constricted portion 17 so as to abut and be aligned with the tube 25. The indicator piece 26 is provided with an inwardly-extending annular portion 27 forming a passage or constriction 28. With this structure, the forming of the liquid film or seal and its periodic explosion can be observed directly outside the container. Thus, instead of attaching a visual flow indicator of the usual large size to the drain passage 14, I can attach a small section of a tube 26 with the constriction therein which will give just as good an indication of the flow from the container.

The container and air tube are preferably made of glass and the devices adapted to be used with a transparent solution so that the constriction in the air tube is visible from the exterior of the container when the liquid is being withdrawn from the container. In order to provide for this visibility, at least a portion of the container should be substantially transparent, as should the solution. By substantially transparent is meant transparent or sufficiently translucent to permit the constriction in the air tube to be viewed from the exterior of the container through the wall of the container and the solution therein.

The present application constitutes a continuation in part of my co-pending application Serial No. 483,844, now abandoned, which was filed April 21, 1943, for Dispensing of liquids.

Although the invention has been described in connection with a specific embodiment, it will be apparent that modifications and changes may be made without departing from the spirit and scope of the invention.

I claim:

1. A device for dispensing liquids comprising a container having an open neck and being partially filled with liquid, a closure sealing said neck and having a drain passage and an air inlet passage extending therethrough, a tube communicating with said air passage but extending exteriorly of said container, said tube being provided with a constriction sufficiently narrow so as to form with a film of said liquid a self-sustaining liquid film providing a liquid seal across said tube and to produce explosive strokes of liquid in the tube when liquid is being drained from the container, said tube having a transparent portion through which said explosive strokes are visible.

2. A device for dispensing liquids comprising a transparent container having an open neck at one end and containing liquid, a closure sealing said neck and having a drain passage and an air inlet passage extending therethrough, a transparent tube communicating with said air inlet passage and containing a film of liquid therein, said tube being of substantially uniform diameter throughout except that at one point outside of said closure the tube is provided with a narrow bead extending inwardly to form a constriction supporting said liquid film to form a liquid seal across said tube and to produce explosive strokes of liquid in the tube when liquid is being drained from said container.

3. A device for dispensing liquids comprising a transparent container having an open neck at one end and containing liquid, a closure sealing said neck and having a drain passage and an air inlet passage extending therethrough, a transparent tube communicating with said air inlet passage and containing a film of liquid therein, said tube being of substantially uniform diameter throughout except that at one point within said container the tube is provided with a narrow bead extending inwardly to form a constriction supporting said liquid film to form a liquid seal across said tube and to produce explosive strokes of liquid in the tube when liquid is being drained from the container.

4. A device for dispensing liquid comprising a transparent container having an open neck at one end and being partially filled with liquid, a closure sealing said neck and having a drain passage and an air inlet passage extending therethrough, a transparent tube communicating with said air inlet passage and containing a film of liquid therein, said tube being of substantially uniform diameter throughout except that the tube is provided at least at one visible point within said container with a narrow bead extending inwardly to form a constriction supporting said liquid film to form a liquid seal across said tube and to produce explosive strokes of liquid in the tube when liquid is being drained from said container, said strokes bearing a direct proportion in periodicity to the rate of withdrawal of said liquid.

NAURICE M. NESSET.

REFERENCES CITED

The following references are of record in the file of this patent:

UNITED STATES PATENTS

| Number | Name | Date |
|---|---|---|
| 2,196,323 | Norton et al. | April 9, 1940 |
| 2,318,637 | Schwab | May 11, 1943 |

OTHER REFERENCES

Ravitch, "The Blood Bank of the Johns Hopkins Hospital," Journal American Medical Assoc., vol. 115, No. 3, July 20, 1940, pp. 171—177.